United States Patent [19]

Torii et al.

[11] Patent Number: 5,187,996
[45] Date of Patent: Feb. 23, 1993

[54] INDUSTRIAL ARTICULATED ROBOT PROVIDED WITH A DRIVING LINKAGE

[75] Inventors: Nobutoshi Torii, Hachiojo; Yasuo Naito; Satoshi Kinoshita, both of Yamanashi, all of Japan

[73] Assignee: Fanuc, Ltd., Yamanashi, Japan

[21] Appl. No.: 768,757

[22] PCT Filed: Feb. 15, 1991

[86] PCT No.: PCT/JP91/00186
   § 371 Date: Oct. 15, 1991
   § 102(e) Date: Oct. 15, 1991

[87] PCT Pub. No.: WO91/12117
   PCT Pub. Date: Aug. 22, 1991

[30] Foreign Application Priority Data

Feb. 15, 1990 [JP] Japan ..................... 2-32356

[51] Int. Cl.⁵ ............... G05G 11/00; B25J 9/06; B25J 17/00
[52] U.S. Cl. ..................... 74/479; 414/917; 901/26
[58] Field of Search ........ 74/479; 901/15, 23, 901/27, 26; 414/4, 917

[56] References Cited

U.S. PATENT DOCUMENTS

| | | | |
|---|---|---|---|
| 4,221,953 | 9/1980 | Kiilunen | 901/15 X |
| 4,329,111 | 5/1982 | Schmid | 901/15 X |
| 4,437,635 | 3/1984 | Pham | 74/479 X |
| 4,507,043 | 3/1985 | Flatau | 901/15 X |
| 4,522,555 | 6/1985 | Inoue et al. | 74/479 X |
| 4,531,885 | 7/1985 | Molaug | 74/479 X |
| 4,718,815 | 1/1988 | Lindgren | 901/15 X |
| 4,725,178 | 2/1988 | Reis et al. | 414/4 |
| 4,991,456 | 2/1991 | Shibata et al. | 74/479 |
| 4,998,830 | 3/1991 | Tounai et al. | 74/479 X |

FOREIGN PATENT DOCUMENTS

0078522 11/1983 European Pat. Off. .
0236109 9/1987 European Pat. Off. .
59-182090 10/1984 Japan .

Primary Examiner—Allan D. Herrmann
Attorney, Agent, or Firm—Armstrong, Westerman, Hattori, McLeland & Naughton

[57] ABSTRACT

The present invention is intended to expand the operating region of a driven robot component of a robot by a provision of a driving linkage system for transmitting a drive torque of a drive source unit to the driven robot component, the driving linkage system having two spatially separated linkages, which are different from each other in the phase of motion thereof, to thereby transmit the drive torque from the drive source unit to the driven robot component by at least one of the two linkages even if the other linkage is brought to a dead center state, whereby the torque can be continuously transmitted to the driven robot component.

4 Claims, 5 Drawing Sheets

INDUSTRIAL ARTICULATED ROBOT PROVIDED WITH A DRIVING LINKAGE

DESCRIPTION

1. Technical Field

The present invention relates to an industrial robot, and more particularly, to an industrial articulated robot using a linkage for transmitting a torque of a drive source means to thereby drive a robot arm for a swing motion in a vertical plane.

2. Background Art

As is generally known, conventional industrial articulated robots, particularly an industrial articulated robot having robot arms capable of swinging, respectively, on a joint in vertical planes, are classified into those having two robot arms directly coupled together by a joint, and those of a parallel linkage type having two robot arms joined together by a joint in such a manner that a torque for driving the front arm among the two robot arms is transmitted thereto from a drive motor through a parallel linkage.

Figure 7:
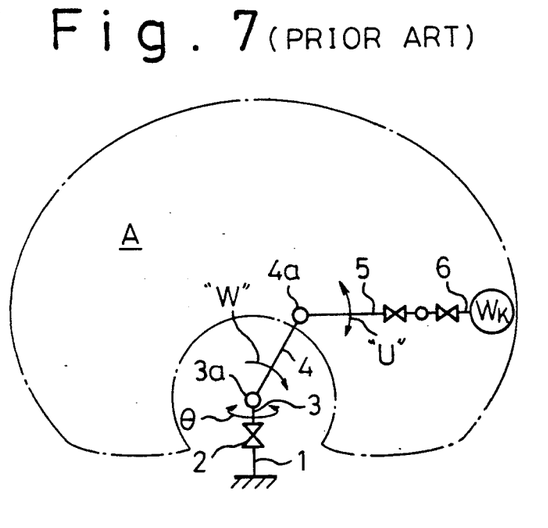
FIG. 7 is a diagrammatic view of a vertical articulated robot of a direct coupling type according to a prior art.

FIG. 7 illustrates a mechanism of a conventional vertical articulated robot of a directly coupled arm type. In this vertical articulated robot, a robot body 3 is mounted on a robot base 1 for rotation on a joint 2 about an axis θ, a first robot arm 4 is supported pivotally for forward and backward swing motions (W-axis motion) on the extremity of the robot body 3 at a pivotal supporting point 3a, a second robot arm 5 is pivotally supported on a joint for upward and downward swing motions (U-axis motion) on the extremity of the first robot arm 4 at a pivotal supporting point 4a, and a robot wrist 6 is supported for turning and swing motions on the extremity of the second robot arm 5. An end-effector and a workpiece inclusively indicated at "Wk" are held on the robot wrist 6. In this robot having the first robot arm 4 and the second robot arm 5 directly coupled together by the joint, drive motors, not shown, are provided at the pivotal supporting points 3a and 4a for directly driving the robot arms 4 and 5, respectively, and the operation space of the robot covered by the robot arms 4 and 5 extends to a large space designated by "A". If, however, a vertical articulated robot of such a type is of a large size and capacity, the vertical articulated robot must be provided with a heavy first robot arm 4, and a heavy second robot arm 5 for handling heavy work, and thus the first robot arm 4 nearer to the robot base 1 is loaded with the very heavy second robot arm 5, and the work and end-effector Wk is supported on the extremity of the second robot arm 5. To reduce such a large load on the first robot arm 4, a parallel linkage 7 including the first robot arm 4 as one of the links, and provided with a balance weight "Wb" as shown in FIG. 8, is employed for driving the second robot arm 5 extending from the extremity of the first robot arm 4.

When such a parallel linkage is employed, the drive motors, not shown, for driving the robot arms 4 and 5 are disposed opposite each other at the pivotal supporting point 3a.

Figure 8:
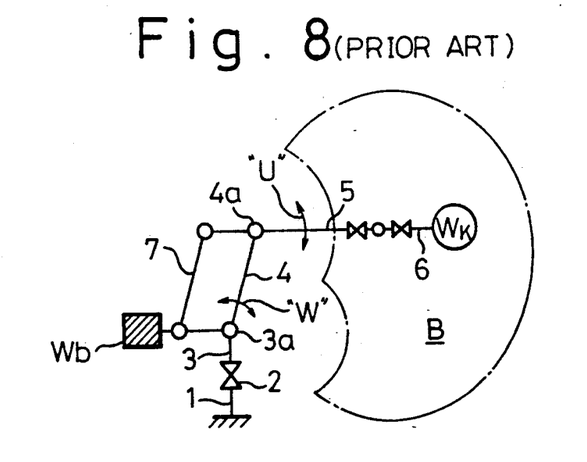
FIG. 8 is a diagrammatic view of an industrial articulated robot provided with a parallel linkage of a prior art.

In the operation of the robot of a parallel linkage type shown in FIG. 8, however, a robot operating space "B" covered by the robot actions of the first robot arm 4 and the second robot arm 5 with the robot body 3 held at an angular position is a limited region excluding a large space extending over a position where the robot is installed, as shown in FIG. 8, because it is possible that the parallel linkage 7 will become flat, (such a position of the parallel linkage 7 will be referred to as "dead center" and such a state of the same will be referred to as "dead center state" hereinafter) and accordingly, its torque transmitting function will become almost null and the parallel linkage 7 will be unable to transmit a large enough torque of the drive motor to swing the second robot arm 5 extending from the extremity of the parallel linkage 7. Accordingly, the robot is unable to meet conditions required of industrial robots, i.e., that the industrial robot must require a narrow area for installation and that the industrial robot must be capable of carrying out its functions in a wide operating region.

DISCLOSURE OF THE INVENTION

Accordingly, an object of the present invention is to provide a driving linkage intended for application principally to an industrial vertical articulated robot provided with a linkage for transmitting driving force, and capable of effectively expanding the operating region of the industrial vertical articulated robot.

Another object of the present invention is to provide an industrial articulated robot capable of carrying out its functions in a large operating space through an improvement of the drive mechanism of a conventional parallel linkage type of a vertical articulated robot.

The present invention provides an industrial articulated robot including at least a first robot arm having a base point and supported for swing motion about the base point, a second robot arm having a base point pivotally joined to the first robot arm and supported for a swing motion about the base point, a robot wrist supported on the extremity of the second robot arm and provided with an end for mounting thereon an end-effector, and a driving linkage means for transmitting the drive torque of a drive source means to the second robot arm, characterized in that the driving linkage means comprises a first linkage and a second linkage, the first and second linkages having pivotal supporting points in common at positions substantially coinciding respectively with the base point of the first robot arm and the base point of the second robot arm, to thereby transmit the torque of the drive source means to the second robot arm through at least one of the first linkage and the second linkage.

The torque of the drive source means provided on a pivotal joint disposed at the base point of the first robot arm is transmitted through either the first linkage or the second linkage to the second robot arm, to drive the same, and therefore, the torque can be transmitted to the second robot arm through either the first linkage or the second linkage even if the other linkage is brought to the dead center state in which the linkage is unable to transmit the torque. Accordingly, an operating space which can be covered by the robot actions of the first and second robot arms of an industrial vertical articulated robot with the robot body of the same capable of turning about a vertical axis held at an angular position, in particular, is far wider than the corresponding operating space covered by the robot actions of the first and second robot arms of an industrial articulated robot provided with the conventional parallel linkage type drive mechanism.

BRIEF DESCRIPTION OF THE DRAWINGS

The above and other objects, features and advantages of the present invention will become more apparent from the ensuing description of a preferred embodiment thereof, taken in conjunction with the accompanying drawings wherein.

BEST MODE OF CARRYING OUT THE INVENTION

Figure 1:
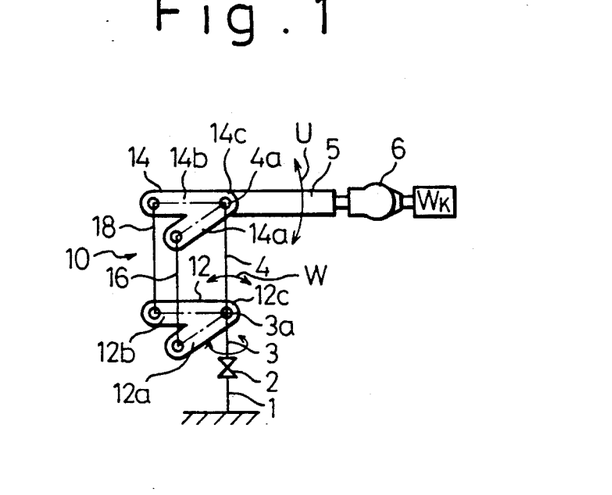
FIG. 1 is a diagrammatic view of a vertical articulated rob provided with a driving linkage unit provided with first and second linkages.

Referring to FIG. 1, an industrial articulated robot is provided, as fundamental constituents, with a robot base 1 installed on a plane for installation, a robot body 3 mounted on the robot base 1 for rotation about a vertical axis (axis $\theta$) on a joint 2, a first robot arm 4 pivotally supported on a joint 3a for swing motion in a vertical plane about a horizontal axis (axis W), a second robot arm 5 pivotally supported on a joint 4a for swing motion in a vertical plane about a horizontal axis (axis U) parallel to the axis W, a robot wrist 6 supported on the extremity of the second robot arm 5, and an end-effector Wk attached to the robot wrist 6 to process a work. The above-mentioned constitution of the industrial articulated robot is similar to the conventional articulated robot. Although not illustrated in FIG. 1, the robot arm 4 is provided internally with a pair of drive motors for driving the robot arms 4 and 5 for a swing motion. The first robot arm 4 is driven directly by one of the drive motors, and the torque of the other drive motor is transmitted through a driving linkage unit 10 to the second robot arm 2 extending frontward from the first robot arm 1, so that the second robot arm 5 carries out a desired vertical swing motion.

The driving linkage unit 10 has a lower link element 12 having a pivotal supporting point on the joint 3a, an upper link element 14 having a pivotal supporting point on the joint 4a, and two bar links 16 and 18 pivotally interconnecting the lower link element 12 and the upper link element 14. The lower link element 12 has a first link arm 12a, a second link arm 12b, and a joining portion 12c where the base ends of the link arms 12a and 12b are joined together. Similarly, the upper link element 14 has a first link arm 14a, a second link arm 14b, and a joining portion 14c. It should be noted that the first link arm 12a of the lower link element 12, the bar link 16, the first link arm 14a of the upper link element 14 constitute a parallel linkage (hereinafter referred to as "first linkage"), and that the second link arm 12b of the lower link element 12, the bar link 18, the second link arm 14b of the upper link element 14, and the robot arm 4 constitute another parallel linkage (hereinafter referred to as "second linkage"). Further, although both the first and second linkages are arranged for transmitting the torque of a single drive motor to the second robot arm 5, the respective actions exhibited by the first and second linkages are neither in phase nor synchronized.

Figure 2A:
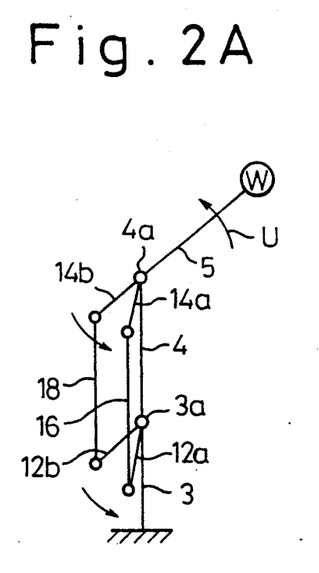
FIGS. 2A and 2B are diagrammatic views of assistance in explaining the dead center state of the first and second linkages, respectively.
Figure 2B:
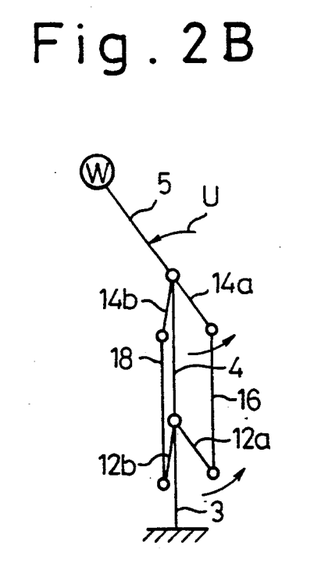

Since the driving linkage unit, differing from the conventional linkage illustrated in FIG. 8, has the first and second linkages separate from each other, the torque of the drive motor can be transmitted, for example, through the second linkage to the second robot arm 5, even if the first linkage provided with the link arm 12a, the bar link 16, and the link arm 14a has been brought to the dead center state thereof, where the first linkage is unable to transmit a torque, as shown in FIG. 2A during, for example, an upward swing of the second robot arm 5. Accordingly, the torque can be continuously transmitted to the second robot arm 5 for continuously swinging the second robot arm 5, so that the second robot arm 5 is able to swing upward through a wide range. Furthermore, even if the second linkage has been brought to the dead center state thereof as shown in FIG. 2B, by the further upward swing motion of the second robot arm 5, the first linkage restores its torque transmitting function in such a state and transmits the torque to the second robot arm 5. Consequently, the second robot arm 5 is able to move in a wide operating space excluding a particular operating space in which the motion of the second robot arm 5 is subject to interference by the first robot arm 4 or the robot body 3; namely, the industrial articulated robot, although provided with the driving linkage unit 10, secures a wide operating region comparable to that of a direct coupling type articulated robot as shown in FIG. 7.

Figure 3A:
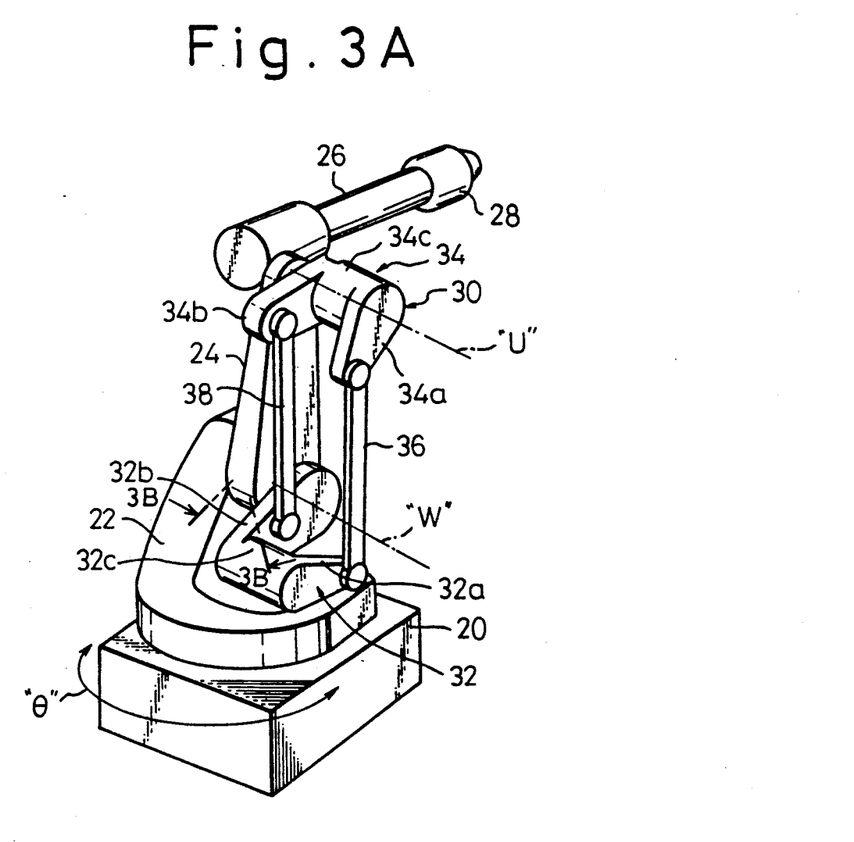
FIG. 3A is a perspective view of an industrial articulated robot with a driving linkage unit in a preferred embodiment according to the present invention.

FIG. 3A illustrates the concrete construction of an industrial articulated robot provided with two linkages, in a preferred embodiment according to the present invention. This robot is provided with a robot base 20, a robot body 22 mounted fixedly on or mounted for rotation about an axis $\theta$ on the robot base 20, a first robot arm 24, a second robot arm 26, a robot wrist 28, and a driving linkage unit 30.

In FIG. 3A, indicated at "W" is the axis of forward and backward swing motion in a vertical plane of the first robot arm 24, and at "U" is the axis of upward and downward swing motions in a vertical plane of the second robot arm 26.

Figure 3B:
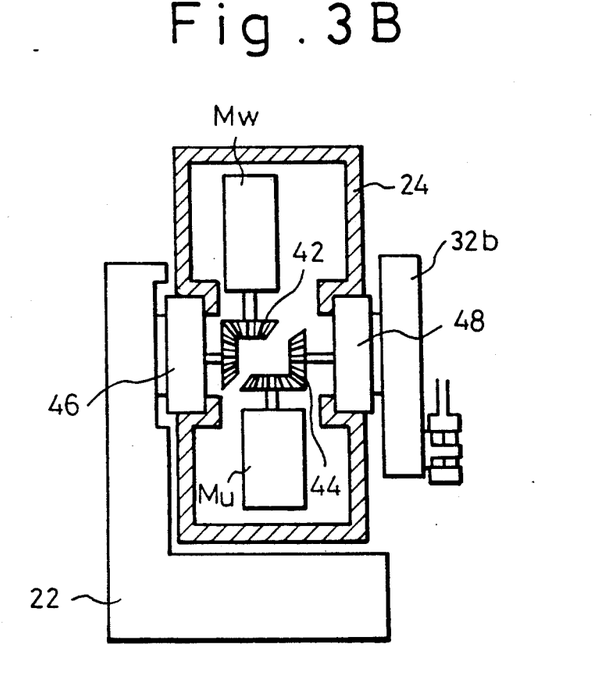
FIG. 3B is a fragmentary sectional view taken along the line 3B—3B in FIG. 3A, showing the disposition of an arm driving unit in a first robot arm included in the industrial articulated robot of FIG. 3A.

As shown in FIG. 3B, the first robot arm 24 is provided internally with two sets of drive mechanisms respectively for driving the first robot arm 24 and the second robot arm 26. The first robot arm 24 is driven directly by the drive mechanism including a drive motor Mw, a bevel gear mechanism 42 and a reduction gear 46, and the second robot arm 26 is driven through a driving linkage unit 30, which will be described later, by the drive mechanism including a drive motor Mu, a bevel gear mechanism 44 and a reduction gear 48.

Referring to FIG. 3A, the driving linkage unit 30 is provided with a lower link element 32, an upper link element 34 and bar links 36 and 38 forming both first and second linkages. The lower link element 32 has a first link arm 32a, a second link arm 32b, and a connecting portion 32c. The upper link element 34 has a first link arm 34a, a second link arm 34b, and a connecting portion 34c. The link arm 32a of the lower link element 32, the bar link 36, and the link arm 34a of the upper link element 34 constitute the first linkage. The link arm 32b of the lower link element 32, the bar link 38, and the link arm 34b of the upper link element 34 constitute the second linkage.

Since the pivotal supporting points of the upper link element 32 and the lower link element 34 are on the axis W and the axis U, about which the first robot arm 34 and the second robot arm 26 swing respectively, the first and second linkages have pivotal supporting points in common, and thus the driving linkage unit 30 has fundamentally the same construction as the driving linkage unit 10 shown in FIG. 1, and the driving linkage unit 30, similar to the driving linkage unit 10, is capable of securing a wide operating region for the second robot arm 26. Nevertheless, according to the practical design of the construction, the connecting portion 34c of the upper link element 34 is extended along the axis U, whereas the connecting portion 32c of the lower link element 32 is not extended along the axis W and is arranged to be dislocated from the axis W.

Figure 4:
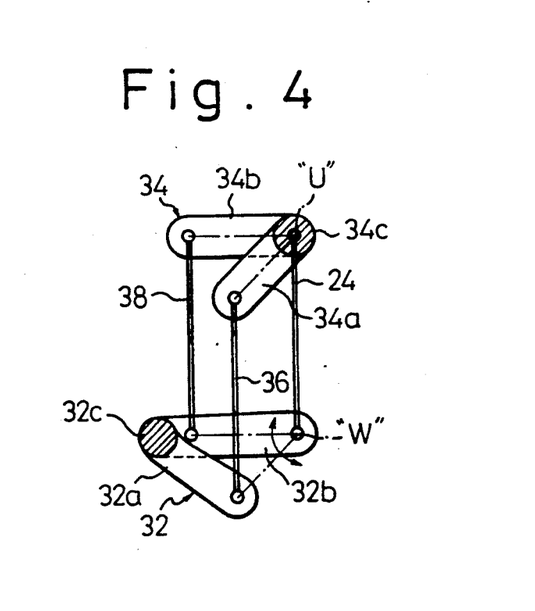
FIG. 4 a diagrammatic view of the driving linkage unit of the industrial articulated robot of FIG. 3A.
Figure 5A:
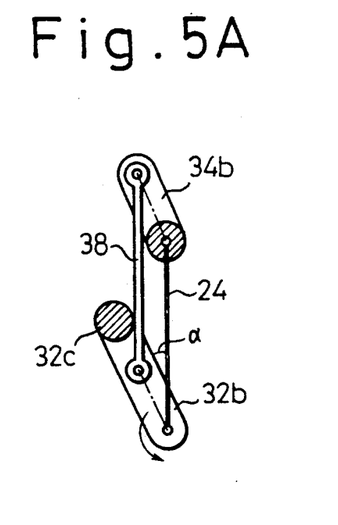
FIGS. 5A and 5B are diagrammatic views of assistance in explaining the mode of operation and the effect of the driving linkage unit of the industrial articulated robot of FIG. 3A.
Figure 5B:
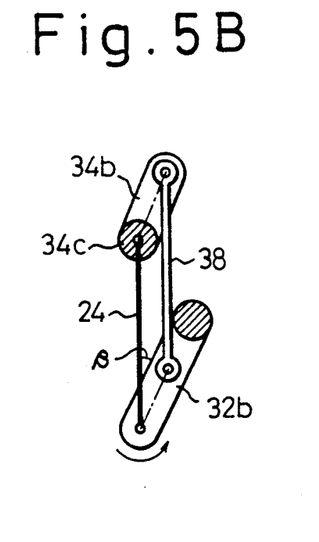
Figure 6A:
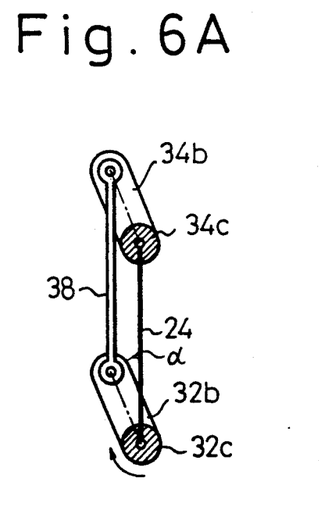
FIGS. 6A and 6B are diagrammatic views of disadvantages a driving linkage not employing the construction of the linkage of FIG. 4.
Figure 6B:
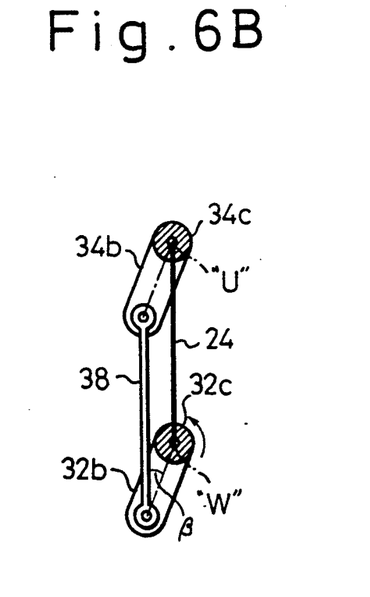

Referring to FIG. 4, typically illustrating the driving linkage unit 30, the connecting portion 34c of the upper link element 34 is joined pivotally to a joint provided at the extremity of the first robot arm 24, and the connecting portion 32c of the lower link element 32 is intentionally dislocated from the axis (axis U) passing the pivotal supporting point at which the first robot arm 24 is pivotally supported on the robot body 22, because it is difficult to design the construction of the robot and fabricate the same so that the components of the first and second linkages of the driving linkage unit 30 do not interfere with each other. As illustrated in FIGS. 5A and 5B, the second linkage including the bar link 38 is able to demonstrate its torque transmitting function in a wide operating range of $\{360° - (\alpha + \beta)\}$ between a position at which the link arm 32b of the lower link element 32 and the bar link 38 interfere with each other (FIG. 5A) and a position at which the upper link element 34b and the bar link 38 interfere with each other; namely, the second linkage is free to turn through a large angular range smaller than 360° corresponding to one full turn thereof by a small interference angle of $(\alpha + \beta)$. Nevertheless, if the connecting portion 32c of the driving linkage unit 30 is not dislocated, namely, if the connecting portion 32c of the lower link element 32 is supported on an axis aligned with the axis W passing the pivotal supporting point at which the first robot arm 24 is pivotally supported on the robot body 22 as typically shown in FIGS. 6A and 6B, the operating space of the second linkage is an angle of $\{180° - (\alpha + \beta)\}$ at most, which is obvious from FIGS. 6A and 6B. It should be understood that the connecting portion 32c is dislocated from the axis W to the advantage of designing a concrete construction on the basis of the results of analysis of the principle of the linkage. The first and second linkages are arranged separately according to the principle of actions of the linkage so that their actions are not in phase, to avoid a state wherein the driving linkage unit 30 is brought to the dead center. Such a fundamental idea of the present invention effectively overcomes the disadvantages of the conventional driving linkage.

As is obvious from the foregoing description of the principle and the embodiment of the driving linkage unit in accordance with the present invention, the parallel linkage in accordance with the present invention does not have a dead center. Accordingly, the application of the parallel linkage to an industrial articulated robot of large size and capacity enables the industrial articulated robot to secure a wide operating space, and thus the industrial articulated robot installed in an area specially prepared for the installation thereof is able to carry out its robot actions in a wide operating space, to thereby greatly enhance the processing ability of the end-effector provided at the extremity thereof.

Although the invention has been described in its preferred form, obviously many changes and variations thereof will occur without departing from the scope and spirit thereof.

LIST OF REFERENCE NUMERALS AND CHARACTERS

1: Robot base
2: Joint
3: Robot body
3a: Pivotal supporting point or joint
4: First robot arm
4a: Pivotal supporting point or joint
5: Second robot arm
6: Robot wrist
7: Parallel linkage
10: Driving linkage unit
12: lower link element
12a: First link arm
12b: Second link arm
12c: Connecting portion
14: Upper link element
14a: First link arm
14b: Second link arm
14c: Connecting portion
16: Bar link
18: Bar link
20: Robot base
22: Robot body
24: First robot arm
26: Second robot arm
28: Robot wrist
30: Driving linkage unit
32: Lower link element
32a: First link arm
32b: Second link arm
32c: Connecting portion
34: Upper link element
34a: First link arm
34b: Second link arm
34c: Connecting portion
36: Bar link
38: Bar link
42: Bevel gear mechanism
44: Bevel gear mechanism
46: Reduction gear
48: reduction gear
Mw: Drive motor
Mu: Drive motor
Wk: End-effector

We claim:
1. A vertical-type industrial articulated robot including at least:
   a first robot arm of a single member having first arm base point thereof and a first opposite point thereof, and supported for swing action in a first vertical plane about said first arm base point;

a second robot arm of a single member having a second arm base point thereof pivotally joined to said first opposite point of said first robot arm and a second opposite point thereof, and supported for swing motion in a second vertical plane in parallel with said first vertical plane about said second arm base point;

a robot wrist supported on said second opposite point of said second robot arm, and having an end thereof for mounting an end-effector thereon; and a driving linkage mean for transmitting a drive torque from a drive source means arranged adjacent to said first arm base point of said first robot arm to said second robot arm, wherein said driving linkage means comprises a first linkage and a second linkage, said first and second linkage having pivotal supporting points in common at two positions substantially coinciding respectively with said first and second arm base points of said first and second robot arms to transmit the drive torque of said drive source means to said second robot arm through at least one of said first and second linkages.

2. A vertical-type industrial articulate robot according to claim 1, wherein each of said first and second linkages of said driving linkage means comprises a parallel linkage comprising an upper link arm, a lower link arm, and two bar links interconnecting said upper and lower link arms, said parallel linkages of said first and second linkages being operative in vertical planes different from one another.

3. A vertical-type industrial articulated robot according to claim 2, wherein said upper link arms of said first and second linkages have respective portions thereof interconnected with one another for forming both of said upper links in an integral element, and wherein said lower link arms of said first and second linkages have respective portions thereof interconnected with one another for forming both of said lower link arms in an integral element.

4. A vertical-type industrial articulate robot according to claim 2, wherein both of said upper link arms have an interconnecting portion thereof pivotally supported at a position adjacent to said second arm base point of said second robot arm, and wherein both of said lower link arms have an interconnected portion thereof arranged to be dislocated from said first arm base point of said first robot arm.

* * * * *

UNITED STATES PATENT AND TRADEMARK OFFICE
CERTIFICATE OF CORRECTION

PATENT NO. : 5,187,996
DATED : February 23, 1993
INVENTOR(S) : Nobutoshi et al

It is certified that error appears in the above-indentified patent and that said Letters Patent is hereby corrected as shown below:

On the cover page, Item [75], "Hachiojo" should be --Hachioji--.

Signed and Sealed this

Nineteenth Day of April, 1994

Attest:

*Attesting Officer*

BRUCE LEHMAN

*Commissioner of Patents and Trademarks*